July 8, 1952  J. G. PLANK  2,602,531
DIVIDING HEAD FOR BOTTLE CONVEYERS
Filed Jan. 3, 1950  2 SHEETS—SHEET 1
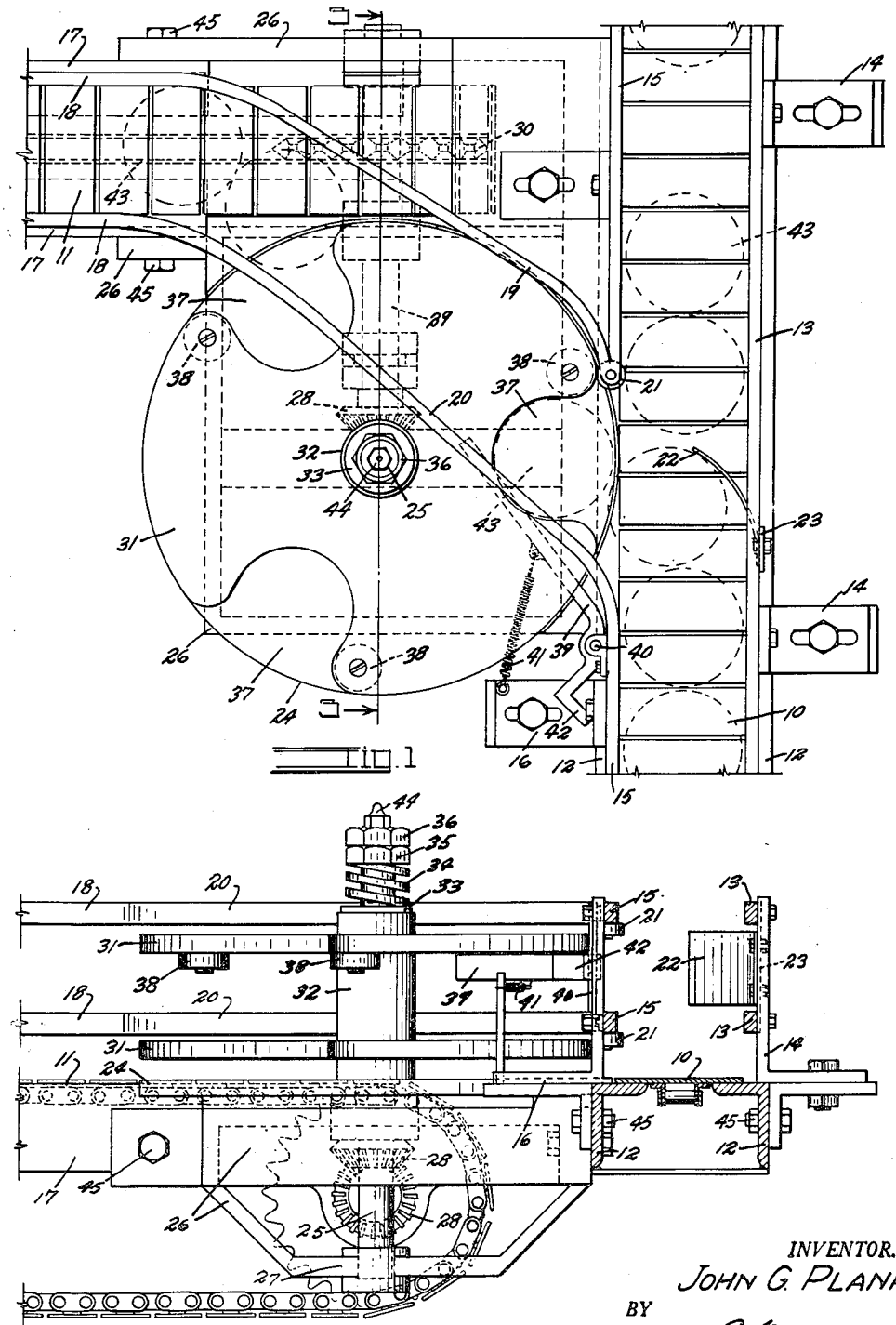
INVENTOR.
JOHN G. PLANK
BY
ATTORNEY July 8, 1952  J. G. PLANK  2,602,531
DIVIDING HEAD FOR BOTTLE CONVEYERS
Filed Jan. 3, 1950  2 SHEETS—SHEET 2
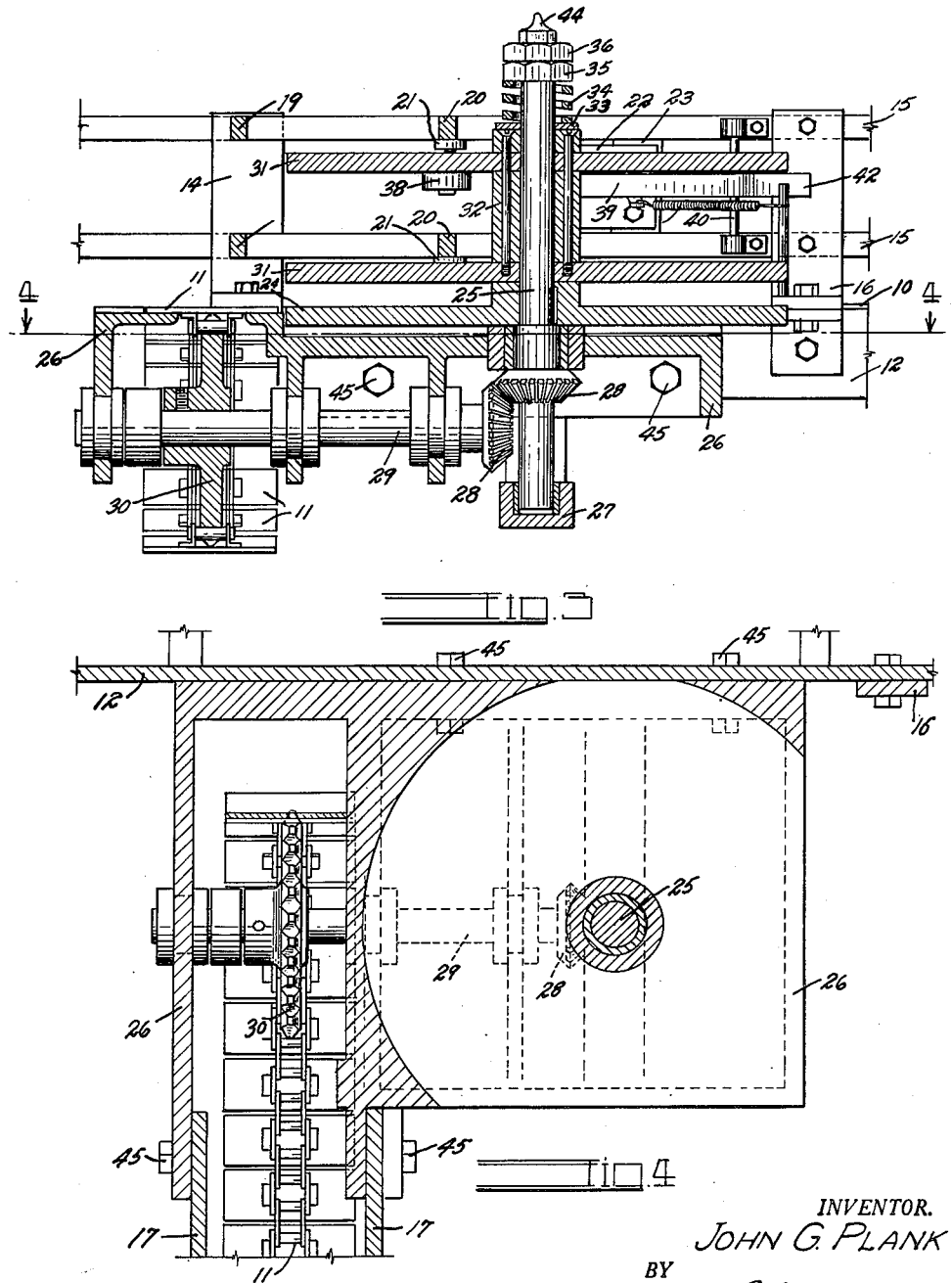
INVENTOR.
JOHN G. PLANK
BY
ATTORNEY Patented July 8, 1952

2,602,531

UNITED STATES PATENT OFFICE 2,602,531

DIVIDING HEAD FOR BOTTLE CONVEYERS

John G. Plank, Golden, Colo.

Application January 3, 1950, Serial No. 136,538

7 Claims. (Cl. 198—22)

This invention relates to a dividing head for article conveyors, that is, to a device for diverting articles from a continuous flow of articles on a traveling conveyor. It is more particularly designed for diverting bottles from a main conveyor leading from a capping machine to side conveyors feeding labeling machines.

The principal object of the invention is to provide a simple and highly efficient device which will divert a proportionate number of bottles from the main conveyor without clogging or interfering with the even flow of bottles on the latter.

Another object is to so construct the device that, should it become jammed for any reason, no damage will be done to the bottles or conveyor mechanism and so that it may be shut down at any time without interfering with the main bottle flow.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved dividing head, illustrating its relation to a main conveyor and a side conveyor;

Fig. 2 is a side view, partially in section, taken on the line 2—2, Fig. 1;

Fig. 3 is a detail cross-section, taken on the line 3—3, Fig. 1; and

Fig. 4 is a horizontal cross-section, taken on the line 4—4, Fig. 3.

In the drawing, a main bottle conveyor is indicated at 10 and a side bottle conveyor is indicated at 11. The conveyors 10 and 11 are of the conventional type employed for transporting bottles and the like, and consist of a link belt conveyor chain, the links of which carry floor plates for supporting the bottles. The floor plates of the main conveyor 10 are supported on two angle track members 12 along which the conveyor plates slide.

A pair of guide rails 13 are supported on adjustable brackets 14 along one track member 12, and a similar pair of guide rails 15 is supported upon similar bracket members 16 along the opposite side of the main conveyor. The side conveyor 11 is of similar construction, its floor plates being supported upon angle track members 17 and being provided with side guide rails 18 similar to the main conveyor.

The improved dividing head is installed by connecting the pair of inside guide rails 15 of the main conveyor to the pair of guide rails 18 at one side of the side conveyor by means of a pair of angle guide rails 19, and by placing a second pair of angle guide rails 20 on the opposite side of the bottle flow between the guide rails 15 and 18. At the point where the second pair of angle guide rails 20 joins the guide rails 15, a pair of resilient bumper rollers 21 are installed in vertically spaced relation, to separate the bottles flowing to the angle guide rails from the main flow of bottles.

This construction leaves an open throat, between the bumper rollers 21 and the point where the angle guide rails 19 join the side guide rails 15, through which bottles may be diverted by means of a flexible leaf spring 22 which is secured to a vertical post 23 mounted between the outside guide rails 13.

The bottles diverted through the open throat are received upon a rotating supporting disc 24 which is keyed or otherwise secured on a vertical plate shaft 25 which is positioned between the two conveyors at a point which will place the periphery of the plate 24 tangent to both conveyors and on a level with the floor plates of both.

The shaft 25 is journalled in a rectangular supporting frame 26 which is secured to the angle track members 12 of both conveyors by means of suitable bolts 45. The shaft 25 rides in a thrust bearing 27 and is driven through the medium of suitable bevel gears 28 from a conveyor shaft 29. The conveyor shaft 29 also carries a terminal sprocket 30 for the side conveyor 11. Thus, whenever the side conveyor 11 is operating, the shaft 25 and the plate 24 will rotate. Suitable lubricators 44 of the "Alemite" type are employed to lubricate the shaft 25 and a hub 32.

A pair of spacing plates 31 is mounted in vertically spaced relation upon the hub 32 which is rotatable about the shaft 25. The rotation of the shaft 25 is communicated to the hub 32 by means of a clutch plate 33 which is urged against the extremity of the hub 32 by means of a compression spring 34. The pressure of the spring 34 may be regulated by means of an adjusting nut 35 which is threaded on the upper extremity of the shaft 25. The nut 35 is locked in set position by means of a jam nut 36.

The plates 31 are similar and are in vertical alignment with each other. Each plate contains a plurality of bottle-receiving notches 37, three being shown. These notches align with the path of travel of the bottles between the angle guide rails 19 and 20.

Cam rollers 38 are rotatably mounted below the upper plate 31, there being one cam roller 38 positioned immediately below the trailing edge of each notch 37. These cam rollers 38 successively contact a swinging gate arm 39 which is mounted on a hinge pin 40 secured to and extending between the inside guide rails 15. A tension spring 41 extends between the gate arm 39 and one of the brackets 16 to constantly urge the gate arm to the open position.

The degree of opening of the gate arm is limited by means of a stop extremity 42 formed on the arm 39 which contacts one of the brackets 16 when the gate arm is in the fully opened position. The gate arm 39 will be swung toward the main conveyor 10 so as to close the side throat and to form a continuous side on the main conveyor 10 whenever one of the cam rollers 38 is in contact with the gate arm.

Let us assume that a row of bottles, indicated at 43, is traveling along the main conveyor 10. As each bottle contacts the spring 22, it will be urged toward the left in Fig. 1. If the gate arm 39 is closed at this time, the bottles will simply snap past the spring 22 and continue on their way. If, however, one of the cam rollers 38 has passed the extremity of the gate arm, the latter will be in the open position of Fig. 1, and a vertical set of the notches 37 of the spacing plates 31 will be in alignment with the open throat. The sidewardly-urged bottle will therefore pass onto the disc 24 and into the notches 37 and be carried between the angle guide rails 19 and 20 by the rotation of the disc 24 and the plates 31. The throat will be immediately closed by the next successive cam roller 38 and will remain closed until the next set of notches 37 arrives at the proper receiving position.

It can be readily seen that there will be a continuous flow of bottles along the main conveyor 10, and a continuous but quantitatively smaller flow of bottles to the side conveyor 11.

Should a bottle become jammed in the notches 37, the plates 31 will simply cease rotating under the friction of the clutch plate 33 and the disc 24 will continue to rotate below the bottles without damage. If the side flow of bottles is not desired, the side conveyor may be stopped without affecting the flow of bottles on the main conveyor 10 for the side throat will be always closed either by the gate arm 39 or by the plates 31 or by a bottle in position in one of the notches.

The invention has been described as more particularly pertaining to the conveyance of bottles. It is, of course, not limited to this particular product since it would function equally with cans and other individual articles.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. Means for diverting individual articles such as bottles, from a first conveyor of the type having side guide rails, comprising: a second conveyor positioned at an angle to the axis of the first conveyor; angularly positioned side guide rails extending from said first conveyor to said second conveyor, there being an open throat in the side guide rails of the first conveyor to allow articles to flow therefrom and between said angularly positioned guide rails; a rotating disc positioned tangent to both conveyors below said angularly positioned rails to receive the articles from the first conveyor and carry them to the second conveyor; a vertical shaft extending upwardly through and affixed to said disc and imparting rotation thereto; and a spacing plate having article-receiving notches concentrically mounted on said shaft above said disc.

2. Means for diverting individual articles such as bottles, from a first conveyor of the type having side guide rails, comprising: a second conveyor positioned at an angle to the axis of the first conveyor; angularly positioned side guide rails extending from said first conveyor to said second conveyor, there being an open throat in the side guide rails of the first conveyor to allow articles to flow therefrom and between said angularly positioned guide rails; a rotating disc positioned tangent to both conveyors below said angularly positioned rails to receive the articles from the first conveyor and carry them to the second conveyor; a vertical shaft extending upwardly through and affixed to said disc and imparting rotation thereto; a spacing plate having article-receiving notches rotatably mounted on said shaft above said disc; and friction means communicating rotation from said shaft to said plate and allowing the rotation of said spacing plate to be retarded relative to the rotation of said disc.

3. Means for diverting individual articles such as bottles, from a first conveyor of the type having side guide rails, comprising: a second conveyor positioned at an angle to the axis of the first conveyor; angularly positioned side guide rails extending from said first conveyor to said second conveyor, there being an open throat in the side guide rails of the first conveyor to allow articles to flow therefrom and between said angularly positioned guide rails; a rotating disc positioned tangent to both conveyors below said angularly positioned rails to receive the articles from the first conveyor and carry them to the second conveyor; a vertical shaft extending upwardly through said disc and imparting rotation thereto; a spacing plate having article-receiving notches rotatably mounted on said shaft above said disc; a gate arm arranged to close said throat during the interval the notches in said plate are moving into alignment with said throat; and means on said first conveyor urging articles toward said throat.

4. Means for diverting individual articles such as bottles, from a first conveyor of the type having side guide rails, comprising: a second conveyor positioned at an angle to the axis of the first conveyor; angularly positioned side guide rails extending from said first conveyor to said second conveyor, there being an open throat in the side guide rails of the first conveyor to allow articles to flow therefrom and between said angularly positioned guide rails; a rotating disc positioned tangent to both conveyors below said angularly positioned rails to receive the articles from the first conveyor and carry them to the second conveyor; a vertical shaft extending upwardly through said disc and imparting rotation thereto; a spacing plate having article-receiving notches rotatably mounted on said shaft above said disc; a gate arm arranged to close said throat; projecting members on said plate positioned to contact said gate arm to close the latter as each notch in said plate moves into alignment with said throat and to release said gate arm when alignment is reached; spring means urging said gate arm to the open position; and means on said first conveyor urging articles toward said throat.

5. Means for diverting individual articles such as bottles, from a first conveyor of the type having side guide rails, comprising: a second conveyor positioned at an angle to the axis of the first conveyor; angularly positioned side guide rails extending from said first conveyor to said second conveyor, there being an open throat in the side guide rails of the first conveyor to allow articles to flow therefrom and between said angularly positioned guide rails; a rotating disc positioned tangent to both conveyors below said angularly positioned rails to receive the articles from the first conveyor and carry them to the second conveyor; a vertical shaft extending upwardly through and affixed to said disc and imparting rotation thereto; a hub rotatably mounted on said shaft above said disc; a pair of vertically spaced spacing plates mounted on said hub, said plates having corresponding article-receiving notches in their peripheries; and friction clutch means imparting rotation to said plates from said shaft and allowing the rotation of said spacing plates to be retarded relative to the rotation of said disc.

6. Means for diverting individual articles such as bottles, from a first conveyor of the type having side guide rails, comprising: a second conveyor positioned at an angle to the axis of the first conveyor; angularly positioned side guide rails extending from said first conveyor to said second conveyor, there being an open throat in the side guide rails of the first conveyor to allow articles to flow therefrom and between said angularly positioned guide rails; a rotating disc positioned tangent to both conveyors below said angularly positioned rails to receive the articles from the first conveyor and carry them to the second conveyor; a vertical shaft extending upwardly through and affixed to said disc and imparting rotation thereto; a hub rotatably mounted on said shaft above said disc; a pair of vertically spaced spacing plates mounted on said hub, said plates having corresponding article-receiving notches in their peripheries; friction clutch means imparting rotation to said plates from said shaft and allowing the rotation of said spacing plates to be retarded relative to the rotation of said disc; cam rollers mounted on one of said plates at the leading edges of said receiving notches; and a swinging gate arm positioned in the path of said cam rollers so as to be contacted and swung by the latter to a position to close said throat when said notches move into alignment with said throat.

7. A dividing head for bottle conveyors adapted to receive bottles from a bottle discharge throat, comprising: a disc rotatably mounted below said throat to receive the bottles therefrom; a spacing plate positioned concentrically above said disc and rotatable therewith, said plate having peripheral bottle-receiving notches positioned to receive bottles from said throat; a hinged gate positioned to swing across and close said throat; actuating means on said plate acting to close said gate as each notch moves into alignment with said throat, and means acting to open said gate as each notch approaches a position of alignment with said throat.

JOHN G. PLANK.

REFERENCES CITED

The following references are of record in the file of this patent:

UNITED STATES PATENTS

| Number | Name | Date |
|---|---|---|
| 1,524,641 | Mayers | Jan. 27, 1925 |
| 1,574,914 | McNamara | Mar. 2, 1926 |
| 1,604,440 | Wilkinson | Oct. 26, 1926 |
| 1,843,522 | Sprague | Feb. 2, 1932 |
| 2,167,343 | Bergmann | July 25, 1939 |